Patented Nov. 28, 1944

2,363,928

UNITED STATES PATENT OFFICE 2,363,928

INSECTICIDE

Seaver A. Ballard, Oakland, and Vernon E. Haury, El Cerrito, Calif., assignors to Shell Development Company, San Francisco, Calif., a corporation of Delaware No Drawing. Application December 1, 1941, Serial No. 421,246

7 Claims. (Cl. 167—30)

This invention deals with a new insecticidal composition of great utility and is particularly concerned with toxic substances suitable for use in household insecticides. Among the best known and most useful insecticides at present are pyrethrum and rotenone. These are both derived from plants grown in foreign countries and are therefore expensive and not always obtainable in the desired quantities.

It is the object of the present invention to provide an insecticide which can be readily manufactured from readily available domestic, inexpensive materials. It is a further object of this invention to provide a very toxic, moderately fast-acting insecticide which is little, if at all, toxic to man and other warm-blooded animals. Another object is to provide a synthetic toxicant which is stable toward sunlight and which is compatible with plant toxics. Other and further objects will be apparent from reading the specification.

It has been found that certain ketol esters may be utilized as insecticides to accomplish one or more of the foregoing objects.

The ketols, to be esterified, as will be discussed later, to produce the ketol esters of the invention, are members of a group of carbocyclic unsaturated ketols having the carbonyl group in the ring and having from 8 to 24, or even more e. g. 34, carbon atoms. Ketols of the above group having at least 15 carbon atoms are preferred, it having been found that the higher members of the esterified series have a more pronounced insecticidal activity.

Suitable unsaturated carbocyclic ketols yielding particularly potent esters may be produced by the aldol condensation of lower alicarbocyclic ketones such as cyclopentenone, cyclohexenone, cycloheptenone, isophorone, and the like. In general cyclic ketones applicable for the purpose of preparing suitable ketols are those having from about 5 to 12 carbon atoms.

A class of cyclic ketones suitable for preparing the ketol esters via the ketols, e. g. isophorone, may be prepared by condensing simple aliphatic ketones such as acetone and methyl ethyl ketone.

The condensation reactions referred to in the foregoing may be carried out with the aid of caustic alkali catalysts more basic than lime, e. g., the alkali metal hydroxides such as sodium and potassium hydroxides, sodamide, sodium ethylate, or other alkali metal alkylates.

The ketols produced by condensing lower ketones ordinarily consist of a mixture of dimers, trimers and other polymers having one or several carbocyclic rings, and ordinarily at least one of the rings is unsaturated. If desired, the mixture of carbocyclic ketols so produced can be used as is, for the purpose of preparing the esters of the present invention, or else it can first be fractionated to separate fractions having different boiling ranges and the several fractions then esterified. Such fractionation is often desirable in that the esters prepared from different fractions may vary in their toxicity, and accordingly in the use to which they are best adapted. Thus the higher boiling fractions yield esters which are more toxic but less volatile than equivalent esters obtained with lower boiling fractions. Therefore the former are very suitable for use in plant or cattle sprays, while the latter are more suitable for use where volatility is of importance, e. g., in household sprays.

The acids suitable for esterifying the ketols are carboxylic acids of from 1–10 and preferably from 2–5 carbon atoms. These acids may be aliphatic, e. g., lower fatty acids such as acetic, propionic, butyric, valeric, etc.; alicyclic, e. g. lower naphthenic acids such as cyclo-butyl carboxylic acids, cyclo pentyl carboxylic acids, lower petroleum naphthenic acids, etc.; aromatic acids, e. g., benzoic, toluic acids, etc.; or heterocyclic such as pyridine carboxylic acids, although the aliphatic acids are preferred.

In general, the usual method of esterification, such as reacting the hydroxy compound to be esterified with an acid, acid chloride, acid anhydride or ketone of the corresponding number of carbon atoms is operative, to produce the instant ketol esters. Some of the ketols, however, may be rather difficult to esterify, and in such instances the acid chloride or acid anhydride method of esterification will be found preferable.

Following is an illustrative example of producing and testing an especially suitable ketol ester: Isophorone was condensed to form di-isophorone by means of NaOH. A vessel equipped with heating and stirring means was charged with four parts by weight of isophorone and about one part of 60% NaOH solution. The phases were separated and the upper phase was washed with water to remove entrained NaOH solution. The organic material then consisted of a mixture of unreacted isophorone and its condensed dimer, and possibly some trimer. The unreacted material was first removed overhead by distillation under a vacuum of about 2 mm., and then the di-isophorone was taken off overhead, whereupon it solidified to form a crystalline solid having a melting point of about 84° C. Two moles of this product, which was identified as di-isophorone, were then refluxed with 3 moles of acetic anhydride for 8 hours at about 180° C. The acetic acid was removed as formed and a conversion of 96.5% of the di-isophorone to the acetate was obtained.

Modified Peet-Grady tests were made of this ketol ester. The general test is fully described in the 1940 "Blue Book," published by the publisher of "Soap and Sanitary Chemicals," shown on pages 193–197 as the large group method. Briefly, the test as practiced consists of releasing 100–150 flies in an air-conditioned cage 6' x 6' x 6' and spraying them with 6 moles of insecticide. After ten minutes' exposure, the number of flies which are incapacitated or "knocked down" is noted and all the flies are transferred to a cage and allowed to recuperate in fresh air for 24 hours, when the dead flies are counted. For the purpose of this study, the official Peet-Grady study was not followed in calculating the results, but only the percentages knocked down at 10 minutes and killed at 24 hours were recorded. For the purpose of the comparison, a spray was included in this test comprised 7.3% of pyrethrum extract and 92.7% of odorless base (kerosene) as a standard, and which had a rating of AA according to the standards of the National Association of Insecticide and Disinfectant Manufacturers' Association. In the table below, a comparison is made of the standard and an insecticidal composition containing the ketol esters of the present invention:

| | Per cent of standard knock-down | Per cent of standard 24-hour kill |
|---|---|---|
| 7.3% by volume pyrethrum extract, 20-1 concentrate, and 92.7% by volume of odorless base (kerosene) | 100 | 100 |
| 4% pyrethrum extract by volume and 2.4% of di-isophorone acetate (a ketol ester) and 93.6% odorless base (kerosene) | 99 | 110 |

A few drops of a solution of the above ketol ester in odorless base kerosene was placed on filter paper and exposed to strong sunlight and air. The liquid evaporated leaving substantially no stain behind. This property is of importance in household insecticides and the like, where absence of staining is highly desirable.

The unsaturated carbo-cyclic ketol esters of the instant invention may be applied to plants and animals in a variety of ways. For use in household insecticides, the ketol esters may be dissolved in a light hydrocarbon oil such as kerosene or kerosene distillate with or without the addition of other insecticides and sprays. Ordinarily from about 1% to 25% of the esters are used in such sprays.

For use on plants the esters may be dissolved in plant spray oils and emulsified in water to produce sprayable emulsions. The common emulsifying agents such as glycerol mono oleate, amine salts, sulfated and sulfonated fatty and mineral oils, soaps, and the like may be used in combination with such sprays. In the same manner the ketol esters themselves without the addition of oil may be emulsified and used as plant spray insecticides.

The esters of our invention may also be adsorbed on finely divided materials such as wood filler, talc, clay, sulfur, or carbon black, and used as dusting insecticides. For this purpose, the heavier solid ketol esters such as di-isophorone acetate described above are preferred.

We claim as our invention:

1. An insecticidal composition comprising a carrier and a carboxylic acid ester of an unsaturated alicarbocyclic ketol having the carbonyl group in the cyclic ring, said compound being further characterized by having between 10 and 34 carbon atoms.

2. An insecticidal composition comprising a carrier and a carboxylic acid ester of an unsaturated alicarbocyclic ketol having the carbonyl group in the cyclic ring, said compound being further characterized by having 20 carbon atoms.

3. An insecticide comprising a carrier and di-isophorone acetate.

4. An insecticidal composition comprising a carrier and a carboxylic acid ester of an unsaturated ketol having at least 2 alicarbocyclic rings.

5. A household insecticide comprising an insecticidal hydrocarbon spray oil and a carboxylic acid ester of a cyclic unsaturated ketol having the carbonyl group in the ring, said compound being further characterized by having between 10 and 34 carbon atoms.

6. A plant spray insecticide comprising a plant spray mineral oil, an emulsifying agent and a carboxylic acid ester of a cyclic unsaturated ketol having the carbonyl group in the ring, said compound being further characterized by having between 10 and 34 carbon atoms.

7. A dust insecticidal composition comprising a finely divided absorptive substance and a carboxylic acid ester of an unsaturated cyclic ketol having the carbonyl group in the ring, said compound being further characterized by having between 10 and 34 carbon atoms.

SEAVER A. BALLARD.
VERNON E. HAURY.